Nov. 22, 1932.                J. SPERLING                1,888,245
                               STRAINER
                          Filed June 23, 1930
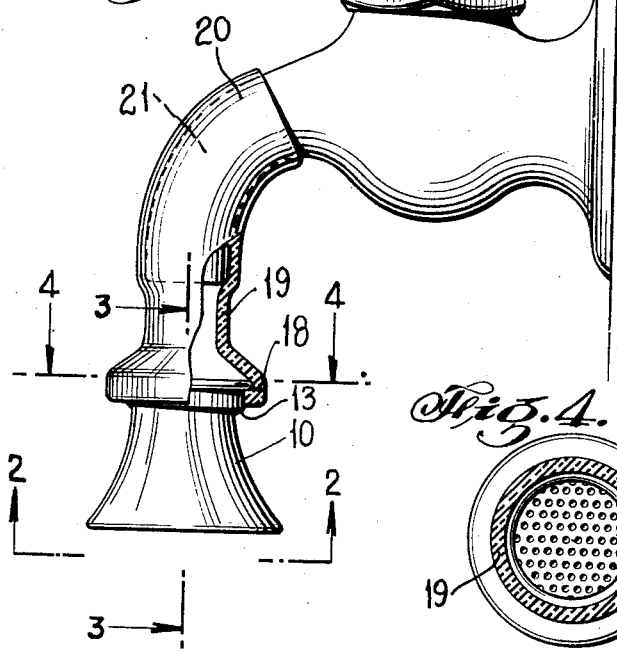
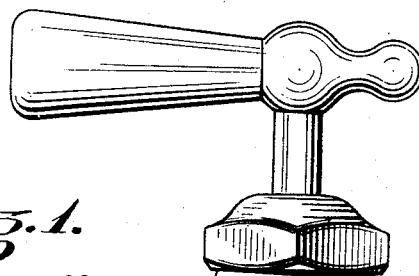
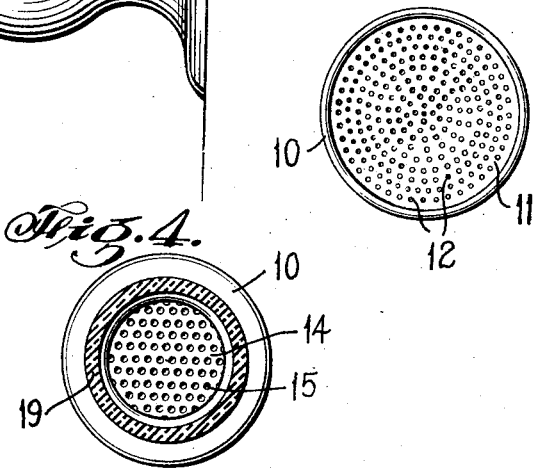
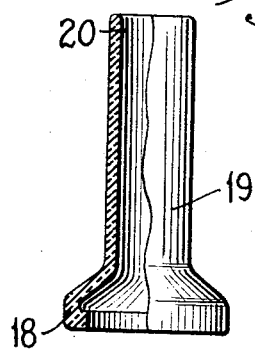
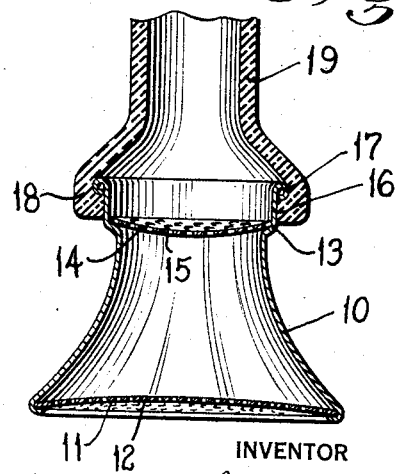
INVENTOR
BY Joseph Sperling
ATTORNEY Patented Nov. 22, 1932

1,888,245

UNITED STATES PATENT OFFICE

JOSEPH SPERLING, OF NEW YORK, N. Y.

STRAINER

Application filed June 23, 1930. Serial No. 463,059.

This invention relates to improvements in strainers, being more particularly directed to a strainer which is of simple construction, comprising of a few parts readily separable, and has incorporated therein a replaceable and separable non-metallic flexible filter or straining unit.

More particularly, this invention is to provide for a strainer or filter formed of a hollow shell in the shape of a frustrum of a cone, carrying a plurality of filter or strainer elements, the larger of which filter elements is fixedly disposed to form one of the bases of the cone, and the smaller of which filter elements, comprising of a non-metallic and flexible disk is disposed on a shoulder formed within the shell to provide for the upper base of the cone; the cone itself being carried by a flexible rubber tubing mounted in position adjacent the shorter end of the cone, and having its free end attachable to the nozzle of the faucet.

These and other advantages, capabilities, and features of the invention will appear from the subjoined detail description of one specific embodiment therefor illustrated in the accompanying drawing, in which Figure 1 is a side elevation of the device as mounted on the faucet.

Figure 2 is a plan view looking upward along lines 2—2 of Figure 1.

Figure 3 is a front view, partly in section, taken along lines 3—3 of Figure 1.

Figure 4 is a plan view looking upwardly along lines 4—4 of Figure 1.

Figure 5 is a side elevation partly in section of the rubber attaching element.

Referring to the reference characters in the drawing, numeral 10 represents an aluminum or other metallic shell, shaped so as to form a frustrum of the hollow cone, in the lower peripheral surface of which there is fixedly mounted the metallic strainer 11, having a series of apertures 12 therein. The upper portion of the lateral surface 10 of the frustrum of a cone, which is curved slightly inwardly from normal, has a shoulder portion 13 formed therein, which is adapted to carry the removable flexible non-metallic strainer 14, the peripheral surface of which rests upon the shoulder of said cone or shell, such strainer 14 having a series of apertures 15 therein, similar in nature to those on metallic strainer 11. The upper portion 16 of the shell 10 is cylindrical in shape, and has an outwardly flaring flange portion 17, which serves to maintain the flanged shoulder portion 18 of the rubber tubing 19 in fixed position, once the same has been inserted over and against the cylindrical portion 16. The free end 20 of the rubber tubing is adapted to be drawn over and carried by the nozzle portion 21 of the faucet.

Although variations may be made to the size and shape of the strainer and the parts forming the same, it is to be understood that the invention relates primarily to a strainer comprising a plurality of filter elements, one being a removable non-metallic element carried above a fixed metallic element, both maintained in position in a structure essentially that of the frustrum of a hollow cone, and carried on a faucet by means of a tubing associated therewith, in a manner so that first a spray of filtered water may be directed from the faucet, and secondly, that such strainer may be displaced in various planes with respect to the nozzle of the faucet, due to the flexible coupling of the strainer with respect to the faucet.

Variations may be resorted to within the scope of the appended claims, without departing from the spirit of my invention.

I claim:

1. A strainer comprising a metallic element in the form of a frustrum of a cone, in the lower base of which there is fixed a metallic filter element, and in the upper base of which there is carried a removable flexible non-metallic filter element, a flange formed on the peripheral surface of the strainer adjacent the upper base, and a removable flexible element surrounding said flanged portion and interlocked therewith, said flexible element being attached by its free end to the nozzle of a faucet.

2. A strainer for fluids, comprising a hollow metallic element shaped in the form of a frustrum of a cone, the lower base of which comprises a fixedly disposed filter, the upper base of which comprises a non-metallic flexible filter, removably carried on a shoulder formed adjacent the upper surface of said element, a flanged portion formed above said last-named filter and adapted to have interlocking with the same one end of a removable flexible connecting member, the other end of which is adapted to be carried on the nozzle of a faucet, whereby fluid from said faucet may pass through said strainer and said strainer may be angularly and laterally displaced.

JOSEPH SPERLING.